(12) United States Patent
Gerolymos

(10) Patent No.: US 11,027,311 B2
(45) Date of Patent: Jun. 8, 2021

(54) FLOW AID FOR AN INFUSION ARRANGEMENT FOR INFILTRATING A RESIN INTO A FIBER MATERIAL

(71) Applicant: Eleftherios Gerolymos, Munich (DE)

(72) Inventor: Eleftherios Gerolymos, Munich (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 165 days.

(21) Appl. No.: 15/872,132

(22) Filed: Jan. 16, 2018

(65) Prior Publication Data

US 2018/0200752 A1   Jul. 19, 2018

(30) Foreign Application Priority Data

Jan. 16, 2017   (DE) .................... 10 2017 100 740.7

(51) Int. Cl.
| | | |
|---|---|---|
| *B05D 1/26* | (2006.01) | |
| *B05D 3/04* | (2006.01) | |
| *B05C 5/02* | (2006.01) | |
| *B05C 1/02* | (2006.01) | |
| *B29C 70/54* | (2006.01) | |
| *B29C 70/44* | (2006.01) | |
| *B32B 38/00* | (2006.01) | |

(52) U.S. Cl.
CPC ............... *B05D 1/26* (2013.01); *B05C 1/025* (2013.01); *B05C 5/02* (2013.01); *B05D 3/0493* (2013.01); *B29C 70/443* (2013.01); *B29C 70/547* (2013.01); *B32B 38/0004* (2013.01)

(58) Field of Classification Search
CPC ....... B29C 70/06; B29C 70/08; B29C 70/222; B29C 70/443; B29C 70/58; B29C 70/54; B05D 1/26; B05D 3/0493; B05C 5/02; B05C 1/02; B32B 38/0004
See application file for complete search history.

(56) References Cited

U.S. PATENT DOCUMENTS

| | | | | |
|---|---|---|---|---|
| 5,403,537 A | * | 4/1995 | Seal .................... | B29C 70/443 156/245 |
| 6,630,095 B2 | | 10/2003 | Slaughter et al. | |
| 6,843,953 B2 | | 1/2005 | Filsinger et al. | |
| | | | (Continued) | |

FOREIGN PATENT DOCUMENTS

| | | |
|---|---|---|
| DE | 10013409 C1 | 11/2000 |
| DE | 10354106 A1 | 6/2005 |
| | (Continued) | |

OTHER PUBLICATIONS

Machine Translation of DE 10 2014 415848 A1 (Year: 2014).*

*Primary Examiner* — Scott R. Walshon
(74) *Attorney, Agent, or Firm* — Lucas & Mercanti, LLP; Klaus P. Stoffel

(57) ABSTRACT

A flow aid for an infusion arrangement for infiltrating a resin into a fiber material, wherein at least two different resin-permeable plies, which lie atop one another and are joined to one another in the region of their faces lying atop one another, with one ply being a peel ply which on its exposed face is covered sectionally or over the full area with an adhesive agent, which is covered with a removable protective ply, or which can be activated after the mounting of the flow aid.

10 Claims, 2 Drawing Sheets

(56) References Cited

U.S. PATENT DOCUMENTS

| | | | | |
|---|---|---|---|---|
| 7,138,028 B2 * | 11/2006 | Burpo | ................... | B29C 70/443 |
| | | | | 156/245 |
| 7,147,448 B2 * | 12/2006 | Slaughter | .............. | B29C 70/443 |
| | | | | 425/129.1 |
| 9,254,622 B2 * | 2/2016 | Flinn | ....................... | B32B 5/024 |
| 2016/0136905 A1 | 5/2016 | Filsinger et al. | | |

FOREIGN PATENT DOCUMENTS

| | | |
|---|---|---|
| DE | 60216108 T2 | 6/2007 |
| DE | 102013006940 A1 | 10/2014 |
| DE | 102014116848 A1 | 5/2016 |
| EP | 2604413 A1 | 6/2013 |
| EP | 2762297 A1 | 8/2014 |
| FR | 2868008 A1 | 9/2005 |
| WO | 2013101354 A1 | 7/2013 |

* cited by examiner

FLOW AID FOR AN INFUSION ARRANGEMENT FOR INFILTRATING A RESIN INTO A FIBER MATERIAL

CROSS-REFERENCE TO RELATED APPLICATIONS

The present application claims priority of DE 10 2017 100 740.7, filed Jan. 16, 2017, the priority of this application is hereby claimed and this application is incorporated herein by reference.

BACKGROUND OF THE INVENTION

The invention relates to a flow aid for an infusion arrangement for infiltrating a resin into a fiber material.

In order to produce fiber composite components, fiber material in the form, for example, of a glass fiber fabric or polymeric fiber fabric is infiltrated, i.e. impregnated, in a conventional way with a resin, such as with an epoxy resin. Fiber composite components of this kind are employed in a very wide variety of different forms and different functions. A fiber composite component of this kind is produced using an infusion arrangement comprising a mold or shaping tool via which the two- or three-dimensional geometry of the fiber composite component to be produced is defined. The fiber material is inserted into this mold. Also introduced is a flow aid, whose purpose is to distribute the fluid resin introduced into the mold so as to enable homogeneous infiltration or saturation. The construction, i.e. the mold, is then given a gas-tight seal using a suitable sleeve or the like. In the interior of this infusion arrangement, a subatmospheric pressure can then be built up for infiltration, by air being drawn off from the interior. The resin is, for example, likewise supplied through this enveloping sleeve, and may be supplied under pressure. In this case, therefore, the method is one of vacuum infusion.

Essential for the properties of the fiber composite component to be produced are the uniform distribution and introduction of the resin into the fiber material, meaning that this material is impregnated as uniformly as possible. For this reason, the flow aid is introduced, and, based on the direction of resin infiltration, is positioned ahead of the fiber material, meaning that the resin has to penetrate the flow aid in order to be able to infiltrate the fiber material. A flow aid of this kind is described in DE 10 2013 006 940 A1, for example. It consists of two different, resin-permeable plies, which according to the teaching there are joined to one another at their edge sides so as to form between them a flow compartment into which the resin is introduced and out of which it is able to pass, through a suitable perforation, to the fiber material. The two plies may consist, for example, of a film or textile material, with two defined flow channels for the resin also able to be formed between the plies. Between the plies there may also be an additional distributor structure incorporated, such as a nonwoven fiber web or a dimensionally stable structure, for example. The construction of a flow aid of this kind, however, is very costly and inconvenient.

An alternative to this that is known is to dispose separate, individual plies on the fiber material—specifically, first of all a peel ply, which bears directly on the fiber material and which sometimes is only peeled from the surface in a subsequent processing operation on the fiber composite component, followed by a release film, which in turn does not enter into a bonded assembly with the resin, this film being followed in turn by a distributor structure such as a lattice or three-dimensional fabric or the like, for example. In this case, first of all, the arrangement of the individual plies, which are placed manually, is inconvenient. Furthermore, the peel ply, in other words the ply to be placed directly on the fiber material, is sprayed with an adhesive agent by the user prior to application, after which it is first introduced and positioned on the fiber material to which it adheres via the adhesive agent. This mode of fabricating the infusion arrangement for the infiltration operation is also costly and inconvenient.

SUMMARY OF THE INVENTION

The problem addressed by the invention, then, is that of specifying a flow aid which is an improvement on the above.

In order to solve this problem, the invention provides a flow aid for an infusion arrangement for infiltrating a resin into a fiber material, characterized in that at least two different resin-permeable plies, which lie atop one another and are joined to one another in the region of their faces lying atop one another, are provided, with one ply being a peel ply which on its exposed face is covered sectionally or over the full area with an adhesive agent, which is covered with a removable protective ply, or which can be activated after the mounting of the flow aid.

A feature of the web-like flow aid of the invention is that it is a multi-ply construction, consisting of at least two plies which lie atop one another, are of different kinds, but are both resin-permeable. This means that the resin is able to pass through both plies. The two plies are then joined to one another in the region of their faces lying atop one another, in other words bonded adhesively to one another in a simple way, something which may be done mechanically, by covering one ply with an adhesive agent in a coating apparatus, after which the two plies are brought together. This makes it possible to use an exact amount of adhesive agent, and so the adhesive bond is sufficient in holding the two plies together, allowing them to be readily processed in unison and introduced into the mold. The ply assembly here is not too fixed in its form, since ultimately the only aim of this assembly is to fix the plies gently one against another, allowing them to be jointly processed. That processing is then significantly easier than in the case, in particular, of the previous insertion of separate plies, since, indeed, two plies can be introduced simultaneously.

In accordance with the invention, then, one of these plies is a peel ply, this being the ply which is joined directly to the fiber material. This peel ply is then provided in accordance with the invention, sectionally or over the full area on its exposed side, with an adhesive agent—that is, it already has a prefabricated coating of the adhesive agent in the production plant. For introduction, therefore, it is no longer necessary for the user to cover the peel ply manually with an adhesive agent, typically by spraying; instead, this agent has already been applied in prefabricated form. A series of advantages are offered by this design. Firstly, the quantity of adhesive agent applied, since of course it can be simply applied by machine, is always defined exactly and consistently from one flow aid to the next, since the quantity of adhesive agent applied in the context of machine production is standardized. Moreover, the user does not come into contact with any vapors resulting from the manual application of the adhesive agent by spraying, and there is likewise no need for special suction removal of air or the like. Lastly, it removes the need for manual application of adhesive agent within the operating chain, meaning that the introduction of the flow aid can also take place substantially quicker and more easily.

The adhesive agent may be an adhesive agent which from the start, in other words in the processing state, already has adhesive properties, and is therefore slightly tacky. In that case it is covered with a removable protective ply, such as a silicone paper or the like. Alternatively, the formulated adhesive agent applied may be one which can be activated after the mounting of the flow aid, and which in the original state does not as yet have any adhesive properties, instead acquiring them after mounting, thus becoming tacky and adhering to the fiber material when, for example, the infiltrating operation commences. This will be addressed in more detail below.

Overall, consequently, the flow aid allows substantially easier and quicker working, as compared with existing possibilities in the context of the introduction of the necessary plies for resin infiltration.

As described, one ply is a peel ply. The other, further ply may in one alternative be a three-dimensional ply, through which the resin material is able, so to speak, to flow, allowing it to be distributed within the flow aid and infusion arrangement, respectively. This ply thus serves for the distribution and homogenization of the resin. In that case the three-dimensional ply is joined directly to the peel ply via an adhesive bond. A flow aid of this kind is used, for example, if the peel ply fabric is removed directly after infiltration or curing, respectively, and is therefore not intended to remain, at least temporarily, on the fiber composite component.

Alternatively to the use of a three-dimensional ply of this kind, the further ply may also be a release film, which does not enter into a firm, adhering bond with the resin. This release film is likewise joined only gently, via the adhesive layer, to the peel ply, and can therefore easily be removed from the peel ply after the infiltration and the curing of the resin. It parts from the peel ply, which remains on the fiber composite component.

In addition to this two-dimensional construction of the flow aid, provided in the simplest embodiment of the invention, it is conceivable for the flow aid also to have a further resin-permeable ply, and for there therefore to be three different resin-permeable plies lying atop one another, joined to one another via an adhesive bond. In that case the first ply may be a three-dimensional ply, whereas the second ply is a release film joined to the three-dimensional ply in the region of their faces lying atop one another, while the third ply is the peel ply which is joined to the release film. This prefabricated flow aid therefore combines all three plies commonly introduced manually into a common element or sheet component that can be processed in a simple way. In accordance with this embodiment of the invention, therefore, none of the plies required need be laid up separately; instead, all three plies of the flow aid of the invention are united, and so the arrangement of plies is ultimately at an end when the flow aid is introduced.

In particular, using this three-ply flow aid, an automated lay-up process is conceivable, which may even include the cutting of the flow aid to the required size/geometry.

Automated operation is likewise possible with regard to the production of the flow aid, since it is a simple technical matter to cover the individual plies, to be brought atop one another, with the corresponding adhesive for their adhesive assembly and subsequently to bring the plies one over another and to bond them to one another. Again, in the context of this automated production, the quantity of adhesive agent applied to the individual plies in order to join them to one another, and applied to the peel ply for bonding with the fiber material, can be precisely metered, and hence operation takes place with a quantity of adhesive which is as little as possible but is still just sufficient, and standardized flow aids can be produced.

If, alternatively to the adhesive agent which is adhesive from the outset, an activatable adhesive agent is employed, it may be a thermally activatable adhesive or a pressure-activatable adhesive. A thermally activatable adhesive is activated, thus being adhesive, when it is sufficiently heated. This is possible in the present case since the infiltration of the resin is accompanied by an exothermic reaction, if the resin itself, whether it is an epoxy resin, a polyester resin or the like, does not already have a sufficient processing temperature. Alternatively, the adhesive agent may also be activatable by pressure. If, then, a subatmospheric pressure is applied within the infusion system, and optionally, for example, the resin is introduced with a slight superatmospheric pressure, the result is that the flow aid is pressed against the fiber material. This produces a sufficiently high surface pressure which leads to the activation of the adhesive agent. That agent, therefore, becomes adhesive or tacky, and so adheres to the flow aid. This likewise effectively prevents the floating of the fiber material or of the flow aid.

The peel ply itself is, for example, a polymeric textile fabric, which is made for example of PE, HDPE, LDPE, PA, PP, PES, PTFE, FEP, ETFE, PFA, PSU, PPS or a polyimide, this listing not being exclusive. The use of high-temperature polymers such as fluorine-containing thermoplastics (e.g. PTFE, FEP, ETFE, PFA), PSU, PES, PPS or a polyamide, which have a very low surface energy and/or a very low adhesion tendency with respect to the resin used, allows the flow aid to be removed easily, both in the dry state and in the wet state of the component. The flow aid can therefore be used again.

The three-dimensional ply may be a polymeric textile fabric, knitted polymeric structure or a polymeric mesh. It therefore has a more or less high three-dimensional construction and is designed such that it allows the resin, introduced for example under pressure, to flow not only within the plane in which the ply is laid but also perpendicularly thereto, in other words through the three-dimensional ply. This polymeric fabric, knitted polymeric structure or polymeric mesh as well may be made, for example, of PE, HDPE, LDPE, PA, PP, PES, PTFE, FEP, ETFE, PFA, PSU, PPS or a polyimide, and this enumeration as well is not exhaustive.

If a release film is provided, it too may be for example a polymeric film. This polymeric film is perforated over its area, by means for example of a multiplicity of small openings or a correspondingly smaller number of larger openings, and the openings may of course be of a very wide variety of geometries. The film may likewise be made, for example, of PE, HDPE, LDPE, PA, PP, PES, PTFE, FEP, ETFE, PFA, PSU, PPS or a polyimide and this enumeration as well is not exhaustive.

In a development of the invention, provision may be made for the flow aid to be trimmed uniformly on all sides. The flow aid therefore has uniform edges at which all of the plies, whether there are two plies or three plies, end in unison. An alternative possibility is for the peel ply to extend over the one or two further plies on one or more sides of the flow aid, with the flow aid trimmed on the remaining sides. In accordance with this embodiment of the invention, then, the peel ply on one or more sides is somewhat larger than the one or two other plies defining the flow aid. This protruding section makes it easier to take hold of the peel ply for subsequent peeling, irrespective of whether the peel ply and therefore the flow aid is to be peeled off completely after the production of the fiber composite component, in other words directly after the infiltration process, or is to be removed only later, meaning that the release film/three-dimensional fabric has already been removed from the peel film beforehand, with only this peel film still remaining on the polymeric composite component. All that the user need do, consequently, is to take hold of the protruding section of peel ply; the peel ply can then be removed as a whole.

In addition to the flow aid itself, the invention further relates to an infusion arrangement comprising a shaping support for accommodating the fiber material to be infiltrated, an envelope for the vacuum-tight covering of the support following application or introduction of the fiber material, and also a flow aid of the type described which is joined or is to be joined to the fiber material via the adhesive layer.

The invention further relates to a method for infiltrating a fiber material with a resin for producing a fiber composite part by means of an infusion arrangement of the type described above, wherein a flow aid of the type likewise described above is applied and fixed via the adhesive agent to the fiber material introduced or applied to the support of the infusion arrangement, and, after a vacuum has been generated in the interior of the infusion arrangement, and/or under superatmospheric pressure, a resin is introduced and is distributed and passed to the fiber material via the flow aid. It is therefore possible here to operate with a vacuum in the interior, with a superatmospheric pressure when introducing the resin, or with both pneumatic variants, in order to introduce and distribute the resin. Excess resin is drawn off. The resin subsequently cures, thus forming the polymeric fiber composite component consisting of the fiber material and the resin matrix embedding said material.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
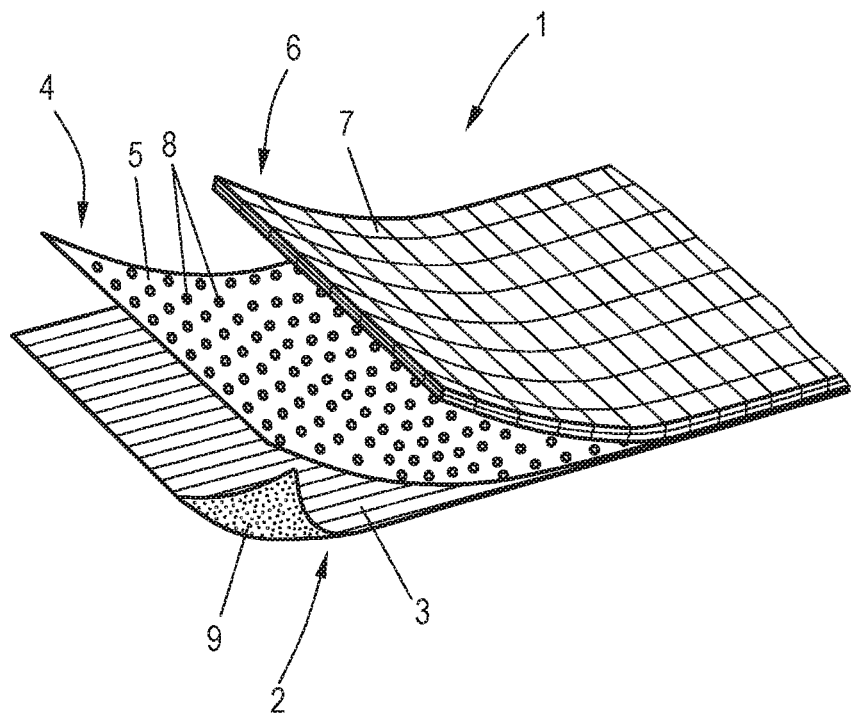
FIG. 1 shows a perspective schematic representation of a three-dimensional flow aid of the invention.

FIG. 1 shows a flow aid 1 of the invention in a first embodiment, serving for infiltrating a resin into a fiber material by means of a corresponding infusion arrangement.

The flow aid 1 shown in FIG. 1 consists of three different, resin-permeable plies lying atop one another, namely a first ply 2 in the form of a peel ply 3, a second ply 4 in the form of a perforated release film 5, and a third ply 6 in the form of a three-dimensional ply 7. All three plies 2, 4 and 6 are bonded to one another, meaning that between the plies in each case is a very thin adhesive layer comprising as little adhesive material as possible. Bonding here takes place within the faces lying on top of one another, with bonding being possible either over the full area, in other words over the entire length and width, or just locally or pointwise. The aim of this bonding is simply to effect a gentle but sufficient fixing of the three plies 2, 4 and 6 to one another; the flow aid 1 itself, of course, remains permeable to resin.

The peel ply 3 comprises a suitable polymeric textile fabric, made for example of PE, HDPE, LDPE, PA, PP, PES, PTFE, FEP, ETFE, PFA, PSU, PPS or a polyimide. The release film is preferably a polymeric film, consisting for example of PE, HDPE, LDPE, PA, PP, PES, PTFE, FEP, ETFE, PFA, PSU, PPS or a polyimide. It has perforation openings 8, allowing resin to pass through it. In the case of the peel ply 3, there is no need for such perforations, since that ply, as a fabric, is permeable to resin in any case.

The three-dimensional ply 7, lastly, is a polymeric fabric, knitted polymeric structure or polymeric mesh, likewise made of PE, HDPE, LDPE, PA, PP, PES, PTFE, FEP, ETFE, PFA, PSU, PPS or a polyimide. As a three-dimensional ply, it is configured such that resin which is introduced, and which is intended to pass through the flow aid 1, is able to flow both in longitudinal and transverse directions within this ply plane, in other words, ultimately, both horizontally and vertically to said plane. The resin flow in the horizontal direction serves for distribution and homogenization; the resin flow in the direction vertical to this then serves for the actual infiltration process, since the resin in that case additionally penetrates the release film 5 or, respectively, its perforation openings 8, and, lastly, penetrates the peel ply 3.

The peel ply 3, finally, is covered on its underside with an adhesive agent 9; this application of adhesive agent may be made over the entire area, or may likewise be provided only locally or pointwise. This adhesive agent 9 effects the bonding of the flow aid 1 to the fiber material that is to be infiltrated, something which will be addressed again below. The adhesive agent 9 is of course applied in such a way that it does not unimperviously seal the peel ply 3, which is after all still to be permeable for resin. The amount of adhesive applied is calculated so as to maintain sufficient permeability, but nevertheless to allow bonding of the flow aid 1 to the fiber material.

The adhesive agent 9 may be an adhesive which is adhesive, i.e. tacky, from the start, and which, although not shown here, is lined with a protective film, a silicone paper for example, which is removed before the flow aid 1 in web form is laid. Alternatively to this, the adhesive agent 9 may also be an adhesive agent which is more active thermally or by pressure, and which therefore develops its adhesive, tacky properties only when it has reached sufficient temperature or when there is sufficient pressure.

The flow aid 1 can be produced with automation as a web material, possibly also wound to form a roll. In that case all that is necessary is for the individual plies first to be coated with the adhesive agent required respectively, or for this adhesive agent to be applied to them, and then for the plies to be brought together and joined to one another. A quantity of adhesive agent of 2-5 g/m2 per layer is sufficient. This can be done automatedly, with the particular advantage that the quantities of adhesive agent used are always precise and consistent in their metering. An advantage of this is that the flow aids which can be produced are standardized, so to speak, and therefore consistently the same. In this case the flow aid 1 is produced in prefabricated form, meaning that the adhesive agent 9 as well is already applied in the plant, and therefore need no longer be applied in situ when the flow aid 1 is being laid up.

Figure 2:
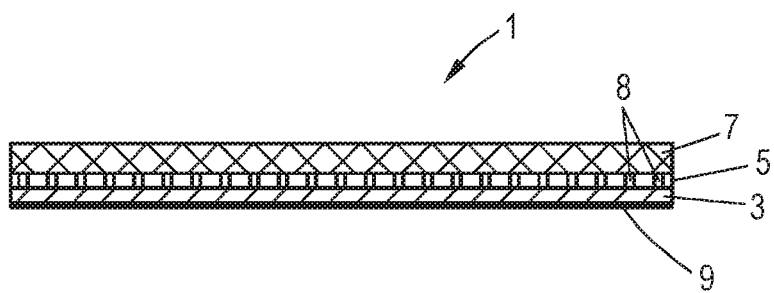
FIG. 2 shows a sectional view through the flow aid from FIG. 1.

FIG. 2 shows a sectional view through the flow aid 1 from FIG. 1, showing the different plies in the form of the peel ply 3, the release film 5 with its perforation openings 8, and the three-dimensional ply 7 in the form of a polymeric fabric, knitted polymeric structure or polymeric mesh. The individual layers of adhesive agent joining the plies to one another are not shown in more detail; only the adhesive layer of the adhesive agent 9 on the underside of the peel ply 3 is shown.

Figure 3:
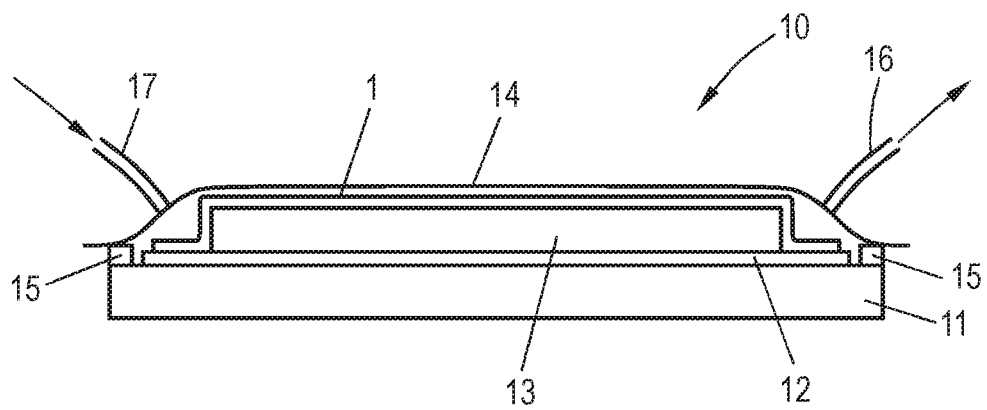
FIG. 3 shows a schematic representation of an infusion arrangement of the invention.

FIG. 3 in the form of a schematic representation shows an infusion arrangement 10 for producing a fiber composite component. This arrangement comprises firstly a mold 11, in other words a shaping tool, having a dividing plate 12, made of PTFE, for example, which does not enter into an adhesive bond with the resin which comes into contact with it. The fiber material 13 for infiltration is placed onto this plate 12, which is part of the mold 11. The fiber material 13 is lined with a flow aid 1 of the invention, which is shown here only in outline. The flow aid 1 is adhered, i.e. fixed, to the fiber material 13 by way of the adhesive agent 9. The lay-up of the flow aid 1 is therefore a single operation, the laying-up of the flow aid 1 entailing the lay-up of all the plies needed, since the flow aid comprises all of the plies needed and represents a single-piece work agent which is easy to manage. Lay-up may even take place with automation if required.

Also shown is a vacuum-tight envelope 14 which is fixed on the mold 11 via corresponding adhesive sealing means 15 such as butyl tapes or the like.

A subatmospheric pressure may be generated within the interior of this infusion arrangement, which comprises, so to speak, an infusion volume, via a suitable vacuum generation apparatus 16, shown here only in outline, whereas the resin to be infiltrated can be introduced, optionally under a slight superatmospheric pressure, by way of a supply apparatus 17, which is likewise represented only schematically. The resin is distributed over the entire length and width via the flow aid 1 and, respectively, the three-dimensional ply 7, and penetrates the flow aid 1 in the direction of the fiber material 13, and then infiltrates it, and so saturates it. After the end of the infiltrating operation, excess resin is drawn off, after which the vacuum-tight envelope 14 can be withdrawn, after which the resin finally cures. Lastly, the flow aid 1 can be removed in parts, with the peel ply 3 remaining on the fiber composite component, or the flow aid can be taken off as a whole, including the peel ply 3.

Figure 4:
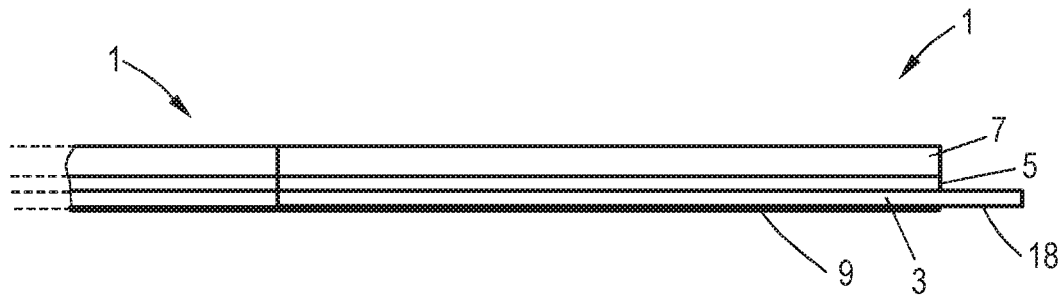
FIG. 4 shows an arrangement of two flow aids of a second embodiment adjacent to one another.

FIG. 4 shows an alternative embodiment of the flow aid 1 from FIG. 3, which therefore likewise has a three-ply construction, comprising the spacer fabric 3 with the adhesive agent 9, the release film 5, and the three-dimensional ply 7. As the sectional view shows, the spacer fabric 3 protrudes somewhat further on one side of the flow aid 1, with a fabric section 18 whose underside is preferably not covered with adhesive agent 9. The purpose of this fabric section 18 is to allow the spacer fabric 3 to be taken hold of at a later point in time in order to be peeled off. The flow aid 1 is laid in such a way that the adhesive section 18 is not embedded into the resin matrix.

Similar to the situation in FIG. 1, where all of the sides are uniformly trimmed, the opposite side, as can be seen, is trimmed uniformly; in this case, therefore, all three plies 3, 5 and 7 finish flush.

Additionally shown is a further flow aid 1, in an end-to-end arrangement, this flow aid being identical in construction. A plurality of flow aids can therefore be positioned adjacently to one another piecewise or on one another, respectively.

Figure 5:
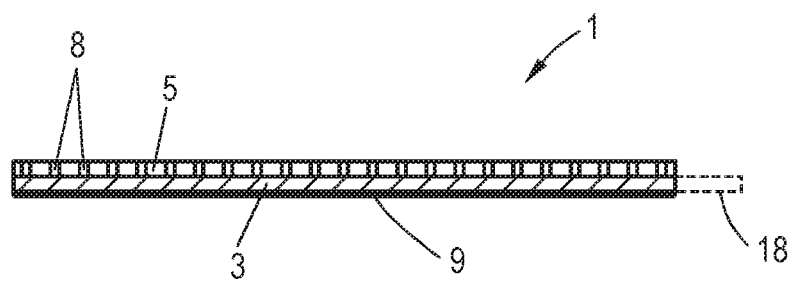
FIG. 5 shows a schematic representation of a flow aid of the invention in a third embodiment.

FIG. 5 shows a further embodiment of a flow aid 1 of the invention, with the same reference symbols being used for identical components. This flow aid 1 consists merely of two plies, namely the spacer fabric 3 with its layer of the adhesive agent 9 applied on the underside, and also the release film 5 with the perforation openings 8. Shown in dashed form is, here again, the possibility of providing a protruding fabric section 18 to the side of the peel ply 3. In this inventive embodiment, therefore, the flow aid 1 is two-ply. A flow aid of this kind may occasionally be sufficient in itself to produce a fiber composite component, specifically, for example, when there is no need for distribution over a large area.

Figure 6:
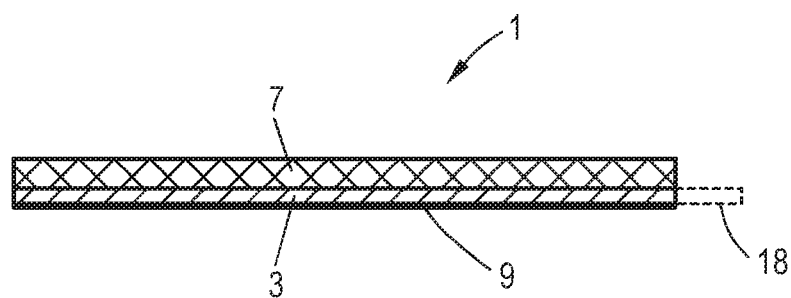
FIG. 6 shows a schematic representation of a flow aid of the invention in a sixth embodiment.

Conversely, FIG. 6 shows a schematic representation of a further, only two-ply embodiment of a flow aid 1, which in this case, again, comprises a peel ply 3 with the applied layer of the adhesive agent 9 and also with the protruding fabric section 18, likewise indicated. The second ply provided here is the three-dimensional ply 7 in the form of a three-dimensional polymeric fabric, knitted polymeric structure or polymeric mesh. A two-ply flow aid 1 of this kind is used, for example, when there is no need for a release film not adhering with the resin, because the flow aid 1 is peeled off completely, thus including peel ply 3, after the infiltration procedure.

While specific embodiments of the invention have been shown and described in detail to illustrate the inventive principles, it will be understood that the invention may be embodied otherwise without departing from such principles.

I claim:

1. A flow aid for an infusion arrangement for infiltrating a resin into a fiber material, consisting of three different resin-permeable plies and optionally a protective ply, which lie atop one another and are joined to one another in the region of their faces lying atop one another, wherein the three plies are optionally joined with adhesive layers, wherein the three different resin-permeable plies lying atop one another are a first ply being a three-dimensional ply, a second ply being a release film joined to the three-dimensional ply in the region of their faces lying atop one another, and a third ply being the peel ply which is joined to the release film, wherein the peel ply has an outer face directed away from the release film that is covered at least sectionally with an adhesive agent, and wherein all of the plies and the adhesive agent are resin permeable.

2. The flow aid according to claim 1, wherein the protective ply is present, and is a a release film or a three-dimensional ply separate from the three resin-permeable plies and removably attached to the adhesive agent on the outer face of the peel ply.

3. The flow aid according to claim 2, wherein the three-dimensional ply is a polymeric textile fabric, knitted polymeric structure or polymeric mesh.

4. The flow aid according to claim 3, wherein the polymeric textile fabric, knitted polymeric structure or polymeric mesh is made of polyethylene (PE), high density polyethylene (HDPE), low density polyethylene (LDPE), polyamide (PA), polypropylene (PP), polyether sulfone (PES), polytetrafluoroethylene (PTFE), fluorinated ethylene propylene (FEP), ethylene tetrafluoroethylene (ETFE), perfluoro alkoxy alkene polymer (PFA), polysulfone (PSU), polyphenylene sulfide (PPS) or a polyimide.

5. The flow aid according to claim 1, wherein the peel ply is a polymeric textile fabric.

6. The flow aid according to claim 5, wherein the polymeric textile fabric is made of polyethylene (PE), high density polyethylene (HDPE), low density polyethylene (LDPE), polyamide (PA), polypropylene (PP), polyether sulfone (PES), polytetrafluoroethylene (PTFE), fluorinated ethylene propylene (FEP), ethylene tetrafluoroethylene (ETFE), perfluoro alkoxy alkene polymer (PFA), polysulfone (PSU), polyphenylene sulfide (PPS) or a polyimide.

7. The flow aid according to claim 1, wherein the flow aid is uniformly trimmed on all sides, or on one or more sides the peel ply extends beyond the three-dimensional ply and the release film and the flow aid is trimmed on the remaining sides.

8. The flow aid according to claim 1, wherein the adhesive agent on the outer face of the peel ply is activatable after mounting of the flow aid.

9. The flow aid according to claim 1, wherein the adhesive layers are present between the first ply and the second ply and between the second ply and the third ply, wherein the adhesive layers are an adhesive agent in a quantity of 2-5 $g/m^2$ and wherein the adhesive layers are resin permeable.

10. The flow aid according to claim 1, wherein the outer face of the peel ply is covered by the adhesive agent in a quantity of 2-5 $g/m^2$.

* * * * *

UNITED STATES PATENT AND TRADEMARK OFFICE
CERTIFICATE OF CORRECTION

| | | |
|---|---|---|
| PATENT NO. | : 11,027,311 B2 | Page 1 of 1 |
| APPLICATION NO. | : 15/872132 | |
| DATED | : June 8, 2021 | |
| INVENTOR(S) | : Eleftherios Gerolymos | |

It is certified that error appears in the above-identified patent and that said Letters Patent is hereby corrected as shown below:

On the Title Page

Delete item (73) Assignee: "VOLKSWAGEN AKTIENGESELLSHAFT, Wolfsburg (DE)".

<div style="text-align: center;">
Signed and Sealed this
Fifteenth Day of February, 2022
</div>

Drew Hirshfeld
*Performing the Functions and Duties of the*
*Under Secretary of Commerce for Intellectual Property and*
*Director of the United States Patent and Trademark Office*